March 7, 1961 W. G. POWELL 2,973,798
MACHINE FOR AND METHOD OF MAKING BAND-TIES
Filed Dec. 10, 1956 6 Sheets-Sheet 1

INVENTOR.
WALTER G. POWELL

BY Mellin and Hanscom
ATTORNEYS

March 7, 1961 W. G. POWELL 2,973,798
MACHINE FOR AND METHOD OF MAKING BAND-TIES
Filed Dec. 10, 1956 6 Sheets-Sheet 3

INVENTOR.
WALTER G. POWELL
BY
Mellin and Hanscom
ATTORNEYS

March 7, 1961  W. G. POWELL  2,973,798
MACHINE FOR AND METHOD OF MAKING BAND-TIES
Filed Dec. 10, 1956  6 Sheets-Sheet 5

INVENTOR.
WALTER G. POWELL
BY
Mellin and Hanscom
ATTORNEYS

March 7, 1961 W. G. POWELL 2,973,798
MACHINE FOR AND METHOD OF MAKING BAND-TIES
Filed Dec. 10, 1956 6 Sheets-Sheet 6

INVENTOR.
WALTER G. POWELL
BY
Mellin and Hanscom
ATTORNEYS

United States Patent Office 2,973,798
Patented Mar. 7, 1961

2,973,798

MACHINE FOR AND METHOD OF MAKING BAND-TIES

Walter G. Powell, Covina, Calif., assignor to Band-Ti Mfg. Co., Los Angeles, Calif., a corporation of California Filed Dec. 10, 1956, Ser. No. 627,477

24 Claims. (Cl. 154—1.6)

This invention relates to a machine for and method of making band-ties.

It is among the objects of this invention to provide a method and machine for interlaying wire strand material and marking-tab material between strips of band-forming material to produce a continuous succession of band-tie units, each provided with a marking tab attached thereto.

Another object of the invention is to provide a machine operable to produce band-ties in groups readily separable into units for individual use, as required.

A further object is to provide a machine having means for varying the size and/or spacing of marking tabs along a continuously formed band.

Another object is to provide a machine arranged to feed strip material of greater width at a lesser speed through a common drive mechanism, and for cutting the strips to appropriate lengths after the strips are united.

Another object is to provide a machine provided with means for activating an adhesive applied to one or more of the contacting faces of strip material fed to the machine.

A still further object is to provide mechanism for moving the activating and/or feed rollers of a band-tie forming strip simultaneously out of engagement with both surfaces of strip material fed therebetween.

Other objects include the provision of novel features of construction, arrangement, and mode of operation affording economy and efficiency in manufacture and in operation.

One form which the invention may assume is exemplified in the following description and illustrated by way of example in the accompanying drawings, in which.

In terms of broad inclusion, the band-tie forming machine of the present invention comprises an arrangement of rollers and associated mechanisms for feeding and adhesively uniting a pair of band-forming strips between which wire strand material is embedded, and between which is also interlaid a succession of marker tabs of predetermined size, spaced at desired intervals along the length of the band. The marker tabs are severed in sections of desired length from a strip of sheet material substantially wider than the band-forming strips, and fed to the band-forming mechanism at a slower rate, variable to control the size and spacing of the tab sections. The invention also contemplates the provision of means for partially severing the band and the tab-forming sections to provide lines of weakened attachment whereby units formed in groups may be readily separated for individual use.

In terms of greater detail, the band-tie forming machine of this invention comprises a frame, designated in general by the numeral 21. An upper strip 22 of band-forming material is supplied from a roll 23 of said material mounted upon a bracket support 24 extending upwardly from the frame 21. An understrip 25 of similar band-forming material is supplied from a roll 26 mounted upon a bracket support 27 upon the lower portion of the frame. The strips 22 and 25 are preferably of a tough, fibrous sheet material such as a long fiber paper, but plastic or suitably sized fabric may be substituted. The strips are adapted to be adhesively united in matching relationship, preferably by means of a heat-responsive adhesive applied to the inner or contacting face of one or both of the strips. For ordinary purposes, a width of about one-half inch is satisfactory, but the width may, of course, be varied between wide limits to meet varying requirements.

The strips 22 and 25 are passed over a plurality of guide rollers 28, suitably mounted upon the frame, for directing the strips in matching superimposed relation between a pair of rollers 29 normally operative for pressing the sheets together. As herein illustrated, a coating of any suitable heat-responsive adhesive is applied to one or both of the strips over the surface which contacts the companion strip, and the rollers 29 are heated so as to activate the adhesive as the strips are pressed together between the rollers.

Strands 30 of relatively soft ductile wire are supplied from rolls 31, mounted upon an upwardly extending support 32. The strands are passed over guides 33 and 34 and are directed between the strips 22 and 25 in spaced parallel relation as they approach the rollers 29. The contacting surfaces of the rollers 29 are provided with grooves 35 to accommodate the wire strands 30 as they are fed past the rollers with the strips 22 and 25.

A strip 36 of tab-forming sheet material, similar to that utilized for the strips 22 and 25, is supplied from a roll 37 mounted upon a bracket support 38 attached to the frame 21. The strip 36 is of substantially greater width than the strips 22 and 25, a width of about two and one-half inches being suitable for use with the preferred one-half inch band-forming strips.

The strip 36 is extended over a guide roller 39 to a pair of feed rollers 40 and 41. From the rollers 40 and 41, the strip is fed between a pair of spaced guides 42 positioned to align the strip in the plane of travel of the strips 22 and 25 past the heating rollers 29. A plate 43 is positioned to support the strip 36 as it is advanced by the feed rollers 40 and 41, and to direct it under the strands 30 and between the strips 22 and 25 as they approach the heating rollers 29.

The band-forming strips 22 and 25, with the wire strands 30 and strip material 36 interposed therebetween, are advanced through the machine by upper and lower feed rollers 44 and 45, respectively. The lower roller 45 is power driven by a motor 46 connected thereto by a sprocket chain 47, which extends over sprockets 48 and 49, arranged to provide a suitable speed ratio. The drive rollers 44 and 45 are preferably of rubber, or equivalent resilient material, against which the band is frictionally pressed to obtain proper driving force.

Figure 10:
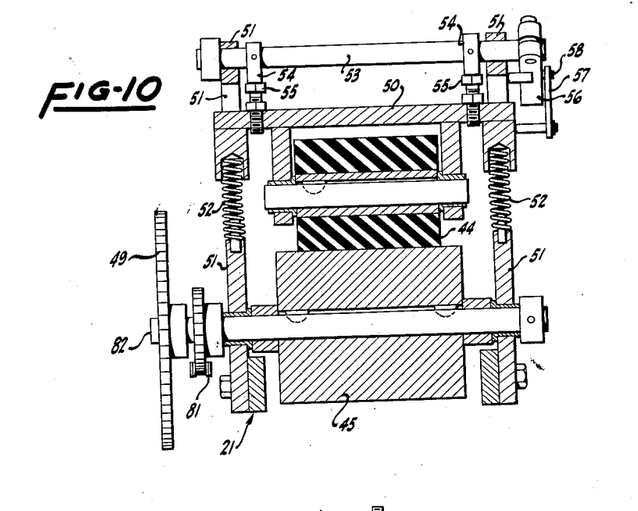
Fig. 10 is a transverse vertical sectional view, the plane of the section being indicated by the line 10—10 of Fig. 7.

The roller 44 is journalled upon a carriage 50 slidably mounted upon a pair of standards 51 secured to the main frame of the machine. The carriage is normally urged upwardly, to raise the roller 44 out of driving engagement with the band, by springs 52. A camshaft 53 journalled in the upper ends of the standards 51 is provided with cams 54 arranged to engage seats 55 adjustably mounted upon the top of the carriage, as best illustrated in Fig. 10 of the drawings. The camshaft 53 and cams 54 are activated by a lever 56, manually operable to rotate the shaft, so as to bring the high point of the cams onto the seats 55 and press the carriage downwardly against the resistance of the springs 52. A latch arm 57, pivoted upon a standard 51, is arranged to engage a pin 58 upon the lever 56 for securing the arm in its driving position, with the drive roller 44 held down against the resistance of the springs 52 to maintain driving engagement with the band. This driving engagement provides the primary means for drawing the strips 22 and 25, and also the wire strands 30, from their respective supply rolls and through the machine. By releasing the lever 56 from the latch 57, the driving force can be instantly interrupted, when desired.

The feed roller 40 is mounted in substantially the same manner as the roller 44 and is controlled in the same manner to apply and to interrupt driving force for feeding the tab-forming strip 36 to the band-forming mechanism. Since the mechanism is substantially identical and its operation the same, further detailed illustration and description of the feed control mechanism for the tab-forming strip is unnecessary.

Figures 7, 8, 9:
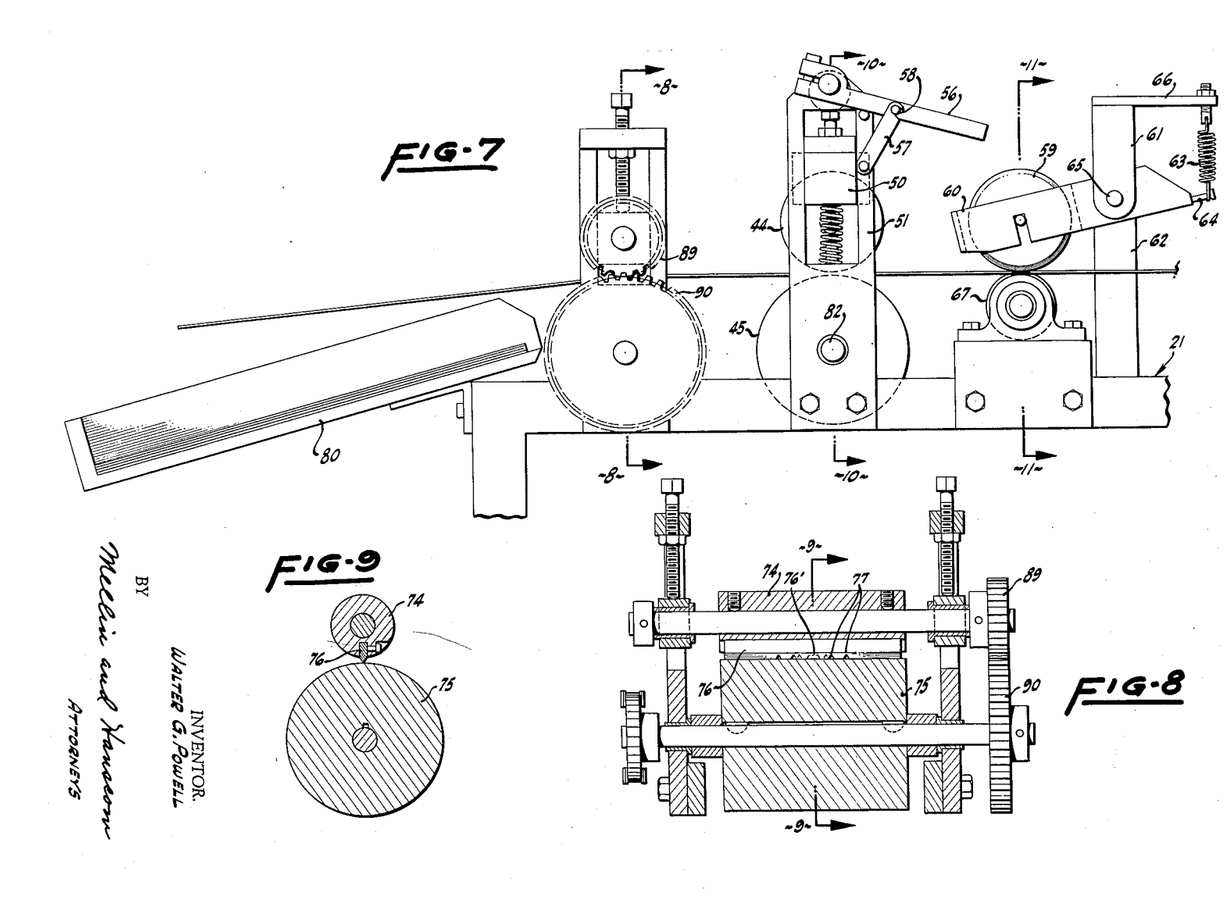
Fig. 7 is a fragmental side elevational view of a portion of the delivery end of the machine.
Fig. 8 is a transverse vertical sectional view, the plane of the section being indicated by the line 8—8 of Fig. 7.
Fig. 9 is a transverse vertical sectional view taken upon the line 9—9 of Fig. 8.
Figure 11:
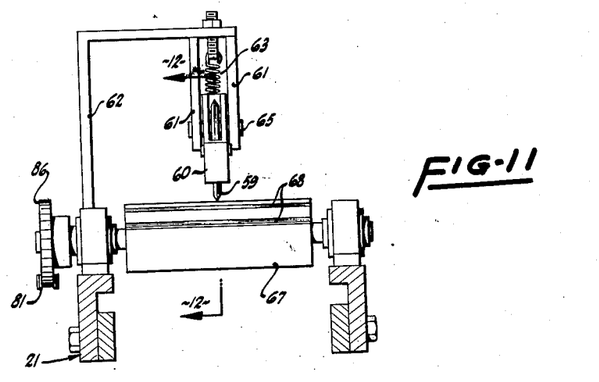
Fig. 11 is a transverse vertical sectional view, the plane of the section being indicated by the line 11—11 of Fig. 7.
Figure 12:
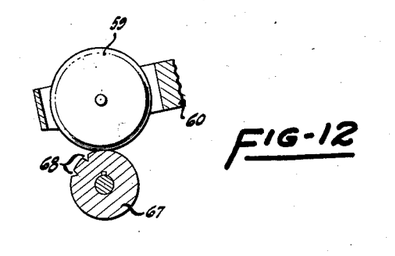
Fig. 12 is a fragmental transverse sectional view taken upon the line 12—12 of Fig. 11.

Between the heating rollers 29 and the feed rollers 44—45 is mounted a cutting blade 59 positioned to slit the band longitudinally as it is advanced therepast. The blade 59 is rotatably mounted upon an arm 60 which is pivoted on a pin 65 mounted through a pair of bracket arms 61 depending from a bracket 62 connected to the main frame 21, as best shown in Figs. 7 and 11 of the drawings. The blade is urged into cutting engagement with the band by a spring 63 attached to a rearward extension 64 of the arm and an extension 66 projecting rearwardly from the bracket arms 61. The blade 59 cuts through the band as it passes over a roller 67 having notches 68 extending longitudinally thereof, as best shown in Fig. 12. The band is cut through along a line midway between the wire strands 30, except for short bonding areas 69 corresponding to the notches 68, which remain uncut and provide weakened attachment for holding the severed halves of the band together at intervals along its length.

Between the tab-feeding rollers 40—41 and the heating rollers 29 is mounted a pair of cutting rollers 70 and 71. The upper roller 71 is provided with a cutter blade 72 mounted in longitudinally extending position upon the periphery of the roller. The lower roller 70 is journalled to provide a rotating cutting surface over which the tab-forming strip 36 is advanced. The rollers 70 and 71 are rotated together in a predetermined ratio to cause the blade 72 to sever a section 73 from the leading end of the strip 36 each time the cutter blade is moved past the companion cutting surface. The strip 36 is supported by the guides 42 substantially tangent to the top of the roller 70, and each section 73 severed from the leading end of the strip is supported upon the guide plate 43 with its leading edge engaged between the plate and the wire strands 30 as they are fed to the machine. Movement of the strands 30 advances the severed section between the band-forming strips 22 and 25 as they approach the heating rollers 29. As the strips are adhesively united under the influence of the rollers 29, the tab sections 73, successively severed from the strip 36, are adhesively secured in place between the band-forming strips.

After leaving the feed rollers 44—45, the formed and longitudinally slit band is directed between a pair of cutting rollers 74 and 75. The upper roller 74 is provided with a cutter blade 76 movable to cut through the band each time the blade passes over the cutting surface of the lower roller 75. As illustrated, the blade 76 is provided with notches 77 arranged to leave uncut bonding areas 78 at intervals across the width of the tab sections 73. The rollers 74 and 75 are positively driven at a desired ratio, and in timed relation to the advance of the band, so that the blade 76 will substantially bisect the tab sections, leaving only the bonding areas 78 to hold the parts together, as indicated in Fig. 13.

Figures 13, 14, 15, 16, 17:
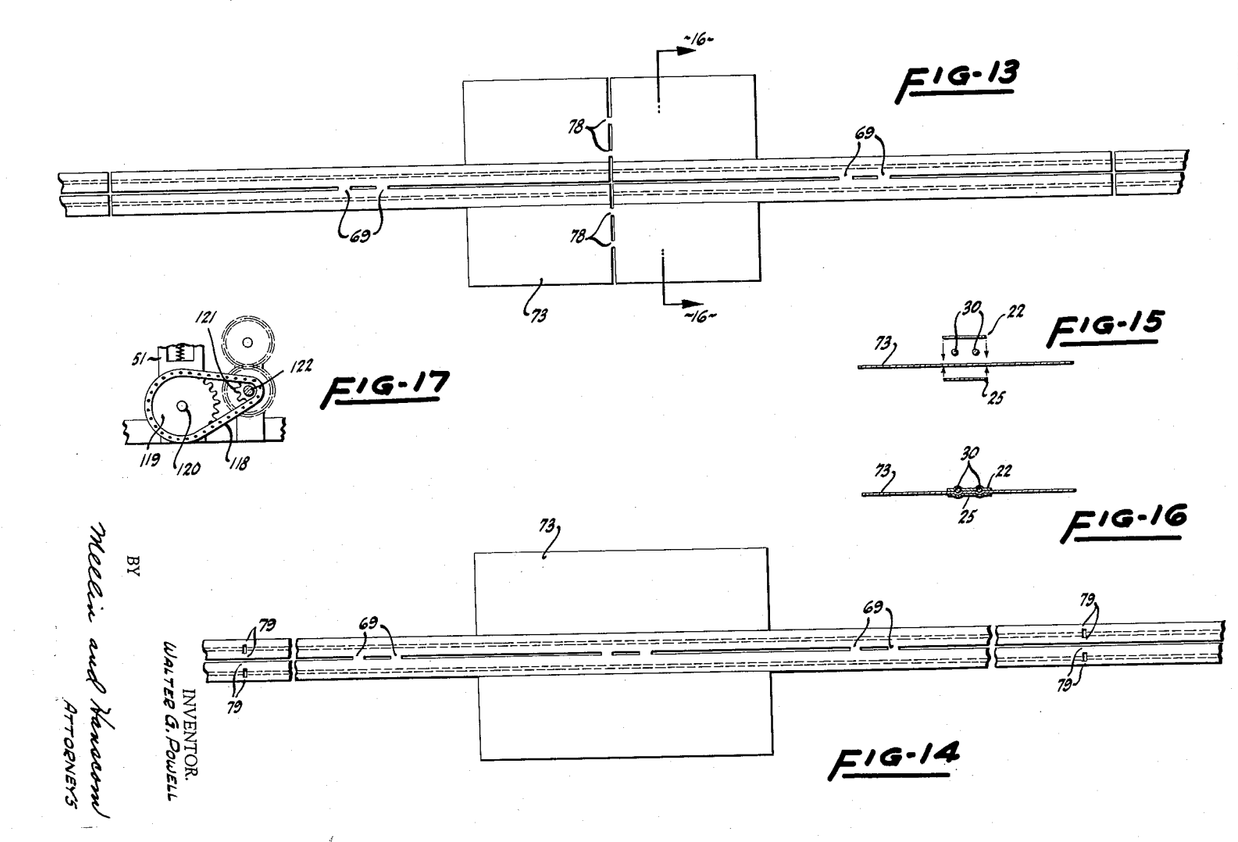
Fig. 13 is a plan view of a preferred form of the band-tie provided by the machine.
Fig. 14 is a plan view of another form of band-tie.
Fig. 15 is an exploded transverse sectional view, illustrating the relationship of the component parts of the band-tie produced by the machine.
Fig. 16 is a transverse sectional view of the finished band-tie, the plane of the section being indicated by the line 16—16 of Fig. 13.
Fig. 17 is a fragmental detail view illustrating the driving connections for the tab forming strip.

Between successive tab sections 73, the blade 76 may be arranged to partially sever the band, including the wire strands, substantially midway between successive tab sections, leaving weakened bonding areas 79 to hold successive lengths of the band together at points of weakened attachment, as indicated in Fig. 14. Alternatively, the band may be severed completely between successive tab sections, successive lengths severed from the band being delivered onto a suitable receiver 80, which may be a tray, chute, conveyor, or other receiving means. The lengths so severed will be longitudinally and transversely slit except for the weak bonds by which a group of four units is held together for separation, as needed.

Instead of partially severing the band and tab section, as shown in Fig. 13, the tab section may be slit longitudinally, but left unsevered transversely, as indicated in Fig. 14. In this modification, the band may be readily separated into two continuous matching portions which may be strung along a shelf, counter, or other support, with the tab portions serving as markers for products grouped in association therewith. The weak bonding areas 79 facilitate the separating of a desired length of band from a continuous strip.

Figure 3:
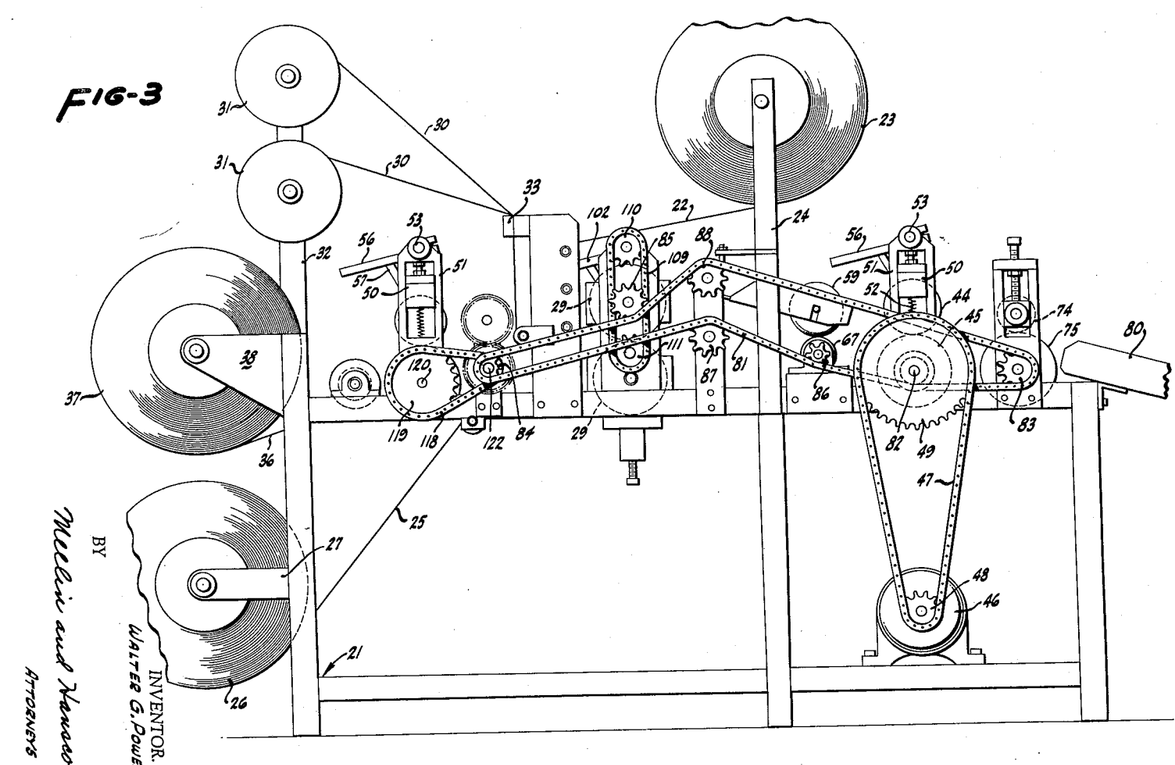
Fig. 3 is a side elevational view of the machine viewed from the driving side, that being the opposite or back side of the machine as illustrated in Fig. 1.

The heating rollers and the several sets of cutting and slitting rollers are positively driven in accurately timed relation by a common sprocket chain 81, as best shown in Fig. 3 of the drawings. The sprocket chain 81 is driven by a sprocket secured to the main shaft 82 of the feed roller 45, which shaft is driven by the motor 46. At the delivery end of the machine, the chain 81 extends over a sprocket 83 secured to the feed roller 75. At the supply end of the machine, the chain 81 extends over a sprocket 84 secured to the roller 41. Between the sprockets 83 and 84, the chain 81 engages a sprocket 85 secured to one of the heating rollers 29, and a sprocket 86 secured to the slitting roller 67. The chain is guided and tightened into driving engagement with the sprockets by suitable idler sprockets 87 and 88.

The cutting rollers 74 and 75 are geared together by suitable spur gears 89 and 90, and the rollers 40 and 41 are similarly geared together. The gears 89 and 90 are best shown in Fig. 8 of the drawings, and the gears for the rollers 40 and 41 are essentially the same.

Figures 4, 5, 6:
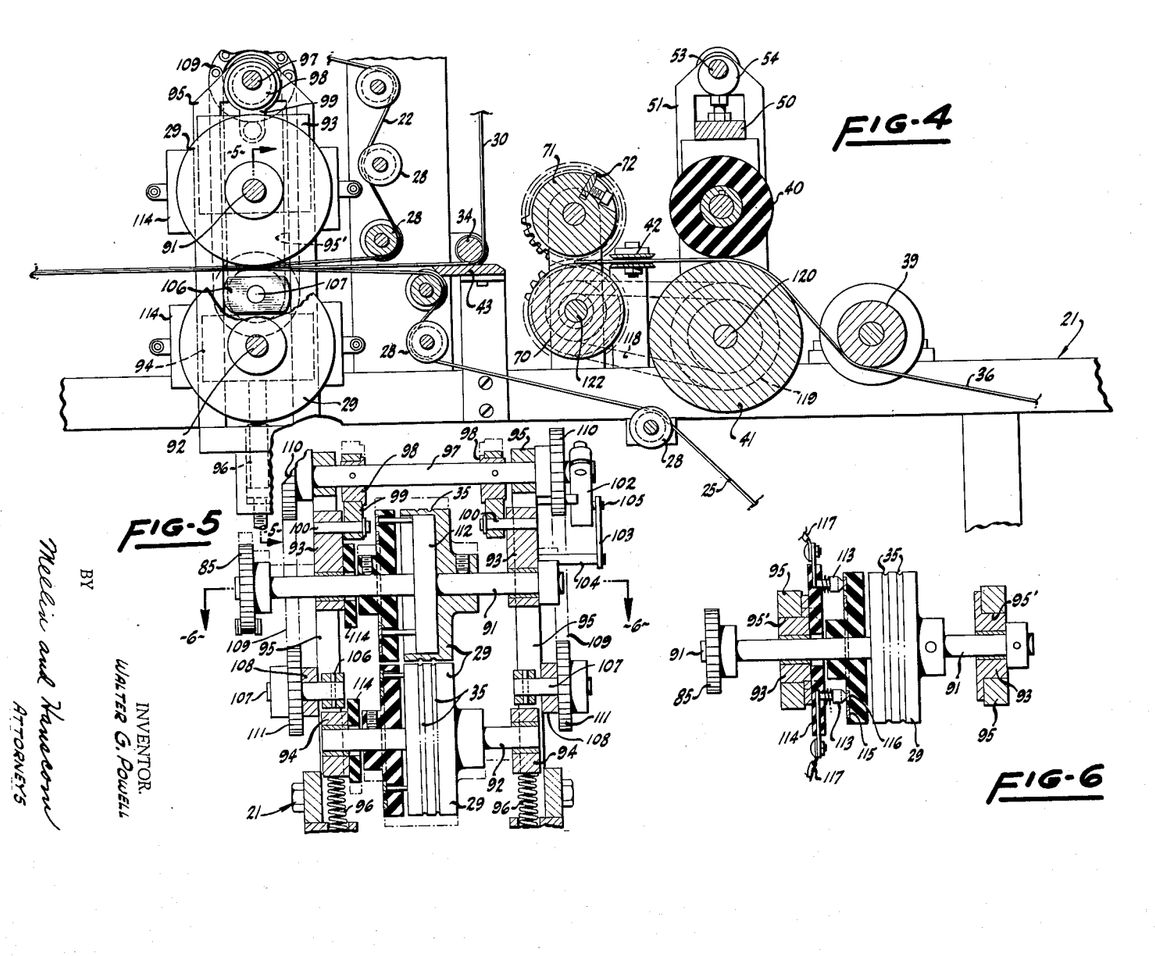
Fig. 4 is a fragmental side elevational view, partly in section, illustrating the manner in which the band-forming materials are fed into the machine.
Fig. 5 is a fragmental transverse vertical sectional detail view, the plane of the section being indicated by the line 5—5 of Fig. 4.
Fig. 6 is a fragmental transverse horizontal view of one of the heating rollers, parts being shown in elevation, the plane of the section being indicated by the line 6—6 of Fig. 5.

The heating rollers 29 are mounted upon shafts 91 and 92 journalled in bearing blocks 93 and 94, respectively. The bearing blocks are slidably mounted in guideways 95, having guide slots 95', vertically disposed upon opposite sides of the frame 21, as best shown in Figs. 4 and 5 of the drawings. The lower roller is urged upwardly to its normal operating position tangent to the plane of movement of the band-forming materials, by springs 96. Above the upper roller 29 is mounted a camshaft 97, journalled at the upper ends of the guideways 95. Eccentric cams 98 are secured to the camshaft, and are connected to the bearing blocks 93 by links 99 which seat over the cams. At their lower ends, the links are connected to the blocks 93 by bearing pins 100 extending inwardly therefrom. The cams are positioned to normally support the upper heating roller in its operating position, tangent to the upper surface of the band as the band-forming materials are fed between the rollers 29.

The camshaft 97 is arranged to be rotatively moved between its normal operating position shown in Figs. 4 and 5, and an inactive position, as indicated in dotted lines in Fig. 5. The throw of the cams 98 is such that when the high points of the cams are in their lowermost position, the upper roller 29 will be supported at its operating level to provide a backing against which the incoming materials are pressed by the lower roller 29, which, in turn, is urged upwardly thereagainst by the springs 96.

The camshaft 97 is actuated by means of a crank arm 102 secured to an outwardly extending end thereof. A latch bar 103 is pivoted upon a mounting pin 104. The bar 103 is notched to engage a latch pin 105 secured to the crank arm 102 in a manner similar to the engagement of the latch 57 with the lever 56 shown in Fig. 7 of the drawings.

Within the slots 95' of the guideways 95 and between the upper and lower bearing blocks 93 and 94, are mounted cams 106, which are operable to depress the lower blocks 94 against the resistance of the springs 96. The cams 106 are secured upon the inner ends of stub shafts 107 journalled in bearing members 108 spanning the guideway slots 95'. The cams 106 are actuated by a sprocket chain 109 mounted over sprockets 110 and 111 mounted upon the camshaft 97 and the stub shafts 107, respectively, for rotating the cams 106 in conformity with movement of the cams 98. The cams 106 have high points arranged to press the lower block downwardly for moving the lower heating roller 29 out of contact with the band-forming strips. Similar high points are formed at diametrically opposite points so that the same cam may be used in either right- or left-hand position.

The heating rollers 29 are provided with electrical heating units 112 of conventional construction enclosed within the rollers. The units 112 are energized by electrical energy supplied thereto through brushes 113, mounted upon an insulating plate 114 and engaging commutator rings 115 and 116, as best shown in Fig. 6. The brushes 113 are connected to a source of electrical energy in conventional manner by connections 117.

The roller 41, by which the tab-forming strip 36 is fed to the band-forming mechanism, is driven by a sprocket chain 118 operating over a sprocket 119 secured to an end of the shaft 120 upon which the roller 41 is mounted. The sprocket chain 118 is driven by a sprocket 121 mounted upon the shaft 122 of the roller 70 or over any of the other driven shafts of the machine. The sprockets 119 and 121 are designed to obtain a desired speed reduction from the shaft 122 to the shaft 120, as best indicated in Fig. 17 of the drawings. The reduced rate of feed of the strip, obtained by the ratio of the sprockets 119 and 121, controls the length and spacing of the tab-forming sections 73 along the band.

In operation, the narrow band-forming strips 22 and 25 are threaded over their respective guide rollers, and between the rollers 29, with the adhesive coated face of each strip facing the other strip. At the same time, the wire strands 30 are threaded over their guides 33 and 34 to be interlaid between the strips. Also, the wide tab-forming strip 36 is threaded over the guide 39, and between the rollers 40—41 and the fixed guides 42, to the cutting rollers 70—71, and thence over the plate 43 for engagement thereon by the strands 30. From the rollers 29, the united strips and the strands enclosed therebetween extend between the feed rollers 44—45.

Because of the reduced speed at which the wide band 36 is fed to the machine, the leading edge is advanced relatively slowly between the strands 30 and the under strip 25 as they approach the rollers 29. The faster moving strands and strip slide past the strip 36 until a section 73 is severed therefrom by the cutter blade 72. The severed section is then carried with the strands and band-forming strips, and is united therewith by the adhesive with which the strips are provided, when that adhesive is activated by the heating rollers 29. The formed band, with sections of tab material spaced therealong, then progresses past the slitting blade 59 where the band and the sections are bisected along the length thereof, except for the bonding areas 69 left uncut as the notches 68 pass under the blade 59.

As the band progresses from the feed rollers 44—45 through the cutter rollers 74—75, the cutter blade 76 is moved to cut through the band and the sections 73, transversely, at points substantially bisecting said sections. The cutter blade 76 has notches 77 arranged to leave uncut areas at intervals across the width of the sections 73 for forming the bonding areas 78 by which the parts are weakly held together.

Figures 1, 2:
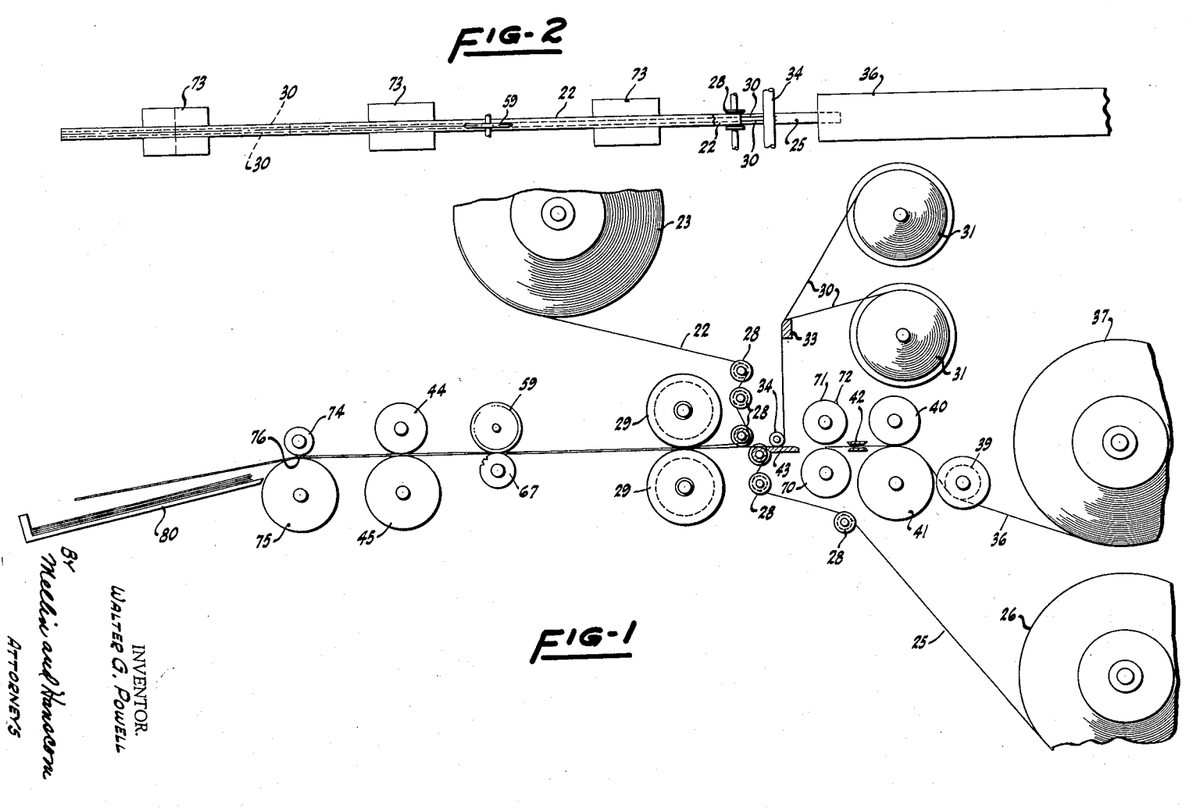
Fig. 1 is a schematic side elevational view illustrating the arrangement of parts and the sequence of operations.
Fig. 2 is a schematic plan view illustrating the progress of the materials through successive phases of the operation.

The gears 89 and 90 are arranged to rotate the rollers 74 and 75 at a ratio of about two to one. The timing is such that one cut is formed across the middle of each section 73, and another cut midway between successive sections 73. The center portion 76' of the blade 76 may be of a length such as to completely sever the band between sections 73, so that successive lengths cut from the band will include a group of four separate band-tie units weakly attached by the bonds 69 and 78. The severed length may be delivered onto the receiver, as indicated in Figs. 2 and 7, for packaging in any manner. Alternatively, the inner notches may be spaced, as indicated in dotted lines in Fig. 8, so as to leave bonding areas 79 by which successive lengths may be weakly bonded for producing strips of any desired length, as indicated in Fig. 14.

During normal operation, the levers 56 are moved to press the feed rollers 44—45 into engagement with the band. The rollers 40—41 are similarly moved into feeding engagement with the strip 36. At the same time, the heating rollers are moved into operating position for heating and pressing together the strips 22 and 25 for adhesively uniting them over the strands 30 and tab sections 73. When, for any reason, it is desired to interrupt the operation of the machine, the latch bars 57 are disengaged from the levers, which are then moved to relieve driving pressure against the band strips.

Because the heat of the rollers 29 may damage the band-forming materials if left in contact therewith at a particular point for any material length of time, the crank arm 102 is arranged to be released from its latch bar 103 and moved to rotate the camshaft. Rotation of the shaft through about 180° causes the cams 98 to raise the upper roller 29 well away from the band. At the same time, the chains 109 rotate the cams 106 for moving the lower roller 29 downwardly, well out of engagement with the under side of the band. The resulting separation of the heating rollers 29 prevents the band materials from being damaged by heat from above or below during periods when the forward feeding of the band-forming materials is interrupted.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A machine for making band-ties comprising a pair of rollers, means for directing a pair of band-forming strips to the rollers in parallel matching relationship for forming a unitary band, means for feeding wire strand material between the strips, means for feeding a relatively wide strip of tab forming material into engagement with the band-forming strips at a slower rate, and means for severing successive sections of the wide strips for attachment to the band at intervals therealong.

2. A machine for forming band-ties as defined by claim 1 wherein the wide strip is interposed between the band-forming strips with edge portions projecting laterally from both sides thereof.

3. A machine for making band-ties comprising a roller, means for directing a pair of band-forming strips over the roller in matching relationship for forming a unitary band, means for feeding a pair of wire strands in spaced parallel relationship between the strips for consolidation therewith in the band, and means for intermittently feeding sections cut from a wider strip to the roller with the band-forming strips and wire strands for attachment thereto, said sections extending laterally from the band to form tabs spaced at intervals therealong.

4. A machine for making band-ties as defined by claim 3 provided with means for slitting the band longitudinally between the wire strands.

5. A machine for making band-ties as defined by claim 4 provided with means for severing the band transversely into matching portions of predetermined length with a tab attached to each portion.

6. A machine for making band-ties as defined by claim 3 provided with means for severing the band transversely into predetermined lengths, each including a tab.

7. A machine for making band-ties as defined by claim 3 wherein the tab-forming sections project laterally from both sides of the band, and the machine being provided with means for slitting the band and tab sections longitudinally substantially midway between the wire strands.

8. A machine for making band-ties as defined by claim 7 provided with means for severing the band transversely into matching portions of predetermined length with a tab attached to successive portions.

9. A machine for making band-ties as defined by claim 7 provided with means for severing the band and tab sections transversely at points substantially midway along the length of the tab sections.

10. A machine for forming band-ties as defined by claim 3 wherein the band-forming strips are provided with adhesive material on their contacting faces, said machine being provided with means for activating the adhesive.

11. A machine for forming band-ties as defined by claim 3 wherein the band-forming strips are provided with heat-responsive adhesive material for joining them along their contacting faces, and means for heating the strips as they are fed to the roller.

12. A machine for forming band-ties as defined by claim 3 wherein the band-forming strips are provided with heat-responsive adhesive material for joining them along their contacting faces as they pass over the roller, and a pair of heating rollers between which the strips are passed as they approach the band-forming roller.

13. A machine for forming band-ties as defined by claim 12 provided with means for separating the heating rollers out of contact with the strips during periods when the operation of the machine is interrupted.

14. In a machine for forming band-ties, the combination with means for forming a two-ply band of formable strip material, of means for feeding a strip of wider tab-forming material between the band-forming strips, and means for severing the tab-forming strip into sections interposed at intervals along the band.

15. The combination defined by claim 14 provided with means for varying the rate of feed of the tab-forming strip to vary the length of the tab sections.

16. In a band-forming machine having a pair of rollers engaging opposite sides of strip material fed therebetween, roller mounting means comprising a pair of spaced parallel supports having guideways extending longitudinally thereof, bearing blocks slidably movable in the guideways and providing journals for the rollers, means normally urging the blocks toward each other to position the rollers in contact with the strip material, a camshaft mounted upon the supports in spaced relation to one of the rollers, cams upon the shaft, means connecting the cams to the bearing blocks of said roller for moving the blocks along the guideways, a second pair of cams rotatably mounted upon the supports adjacent the bearing blocks for the other roller and arranged to impart movement thereto, means for imparting rotative movement to the camshaft, and means connecting the camshaft to said second pair of cams for moving said cams in conformity with the shaft.

17. The combination defined by claim 16 wherein the camshaft is connected to the second pair of cams by chain means mounted over driving sprockets connected to the camshaft and driven sprockets connected to said second pair of cams.

18. A roller separating means for band-forming machines provided with a pair of rollers journalled in bearings slidably movable to actuate the rollers to and from contacting engagement with opposite sides of a band movable therebetween comprising a camshaft, a first pair of cams upon the shaft, links actuated by the cams and connected to the bearings of one roller for moving it away from one face of the band, a second pair of cams mounted in association with the bearings for the other roller and arranged to move the same away from the opposite face of the band, manually operated means for actuating the camshaft, and actuating means connecting the camshaft with the second pair of cams.

19. A roller separating means as defined by claim 18, wherein one roller is normally spring urged into engagement with the other roller and a band passing thereover, and in which said second pair of cams is arranged to displace said roller out of engagement with the band.

20. A roller separating means as defined by claim 19 in which the actuating means comprises sprockets mounted in connection with the camshaft and said second pair of cams, and sprocket chains mounted over corresponding sprockets.

21. A roller separating means as defined by claim 19 provided with manually releasable means for latching the camshaft in roller separating position.

22. In a machine for forming band-ties a pair of heating rollers reciprocally mounted for engaging opposite sides of strip material being fed therebetween, means for feeding strips of sheet material coated with heat-responsive adhesive into matching proximate relation adjacent said rollers, means normally urging each of said rollers toward the other, and means for simultaneously moving each of said heating rollers away from the other; whereby each of said rollers may be simultaneously actuated from a strip contacting position at which position matched strips of material are engaged by said rollers for causing adhesion along said contacting surfaces.

23. The combination defined by claim 22 wherein the heating rollers are provided with electric heating units and means for energizing said units while the rollers are in operation.

24. In a machine for forming band-ties a pair of spaced roller supports having guideways extending longitudinally thereof, bearing blocks slidably movable in said guideways and providing journals for rollers, a pair of heating rollers mounted in said journals and being adapted for engaging opposite sides of strip material being fed therebetween, means for feeding sheets of strip material coated with heat-responsive adhesive into matching proximate relation adjacent said rollers, means normally urging said blocks toward each other to position said rollers in contact with strip material, and means for simultaneously moving each of said heating rollers away from the other; whereby each of said rollers may be simultaneously actuated from a strip contacting position at which position matched strips of material are engaged by said rollers for causing adhesion along contacting surfaces.

References Cited in the file of this patent

UNITED STATES PATENTS

| | | |
|---|---|---|
| 1,014,916 | Stevens | Jan. 16, 1912 |
| 1,211,081 | Case | Jan. 2, 1917 |
| 2,154,474 | Scott | Apr. 18, 1939 |
| 2,290,386 | Schindler | July 21, 1942 |
| 2,302,566 | Minkow | Nov. 17, 1942 |
| 2,404,946 | Clem | July 30, 1946 |
| 2,629,423 | Loeser | Feb. 24, 1953 |
| 2,665,735 | Steffenino | Jan. 12, 1954 |
| 2,680,468 | Lewis | June 8, 1954 |
| 2,732,001 | Halstead | Jan. 24, 1956 |
| 2,733,752 | Bihler et al. | Feb. 7, 1956 |
| 2,818,904 | Ambrose | Jan. 7, 1958 |